Patented Dec. 7, 1943

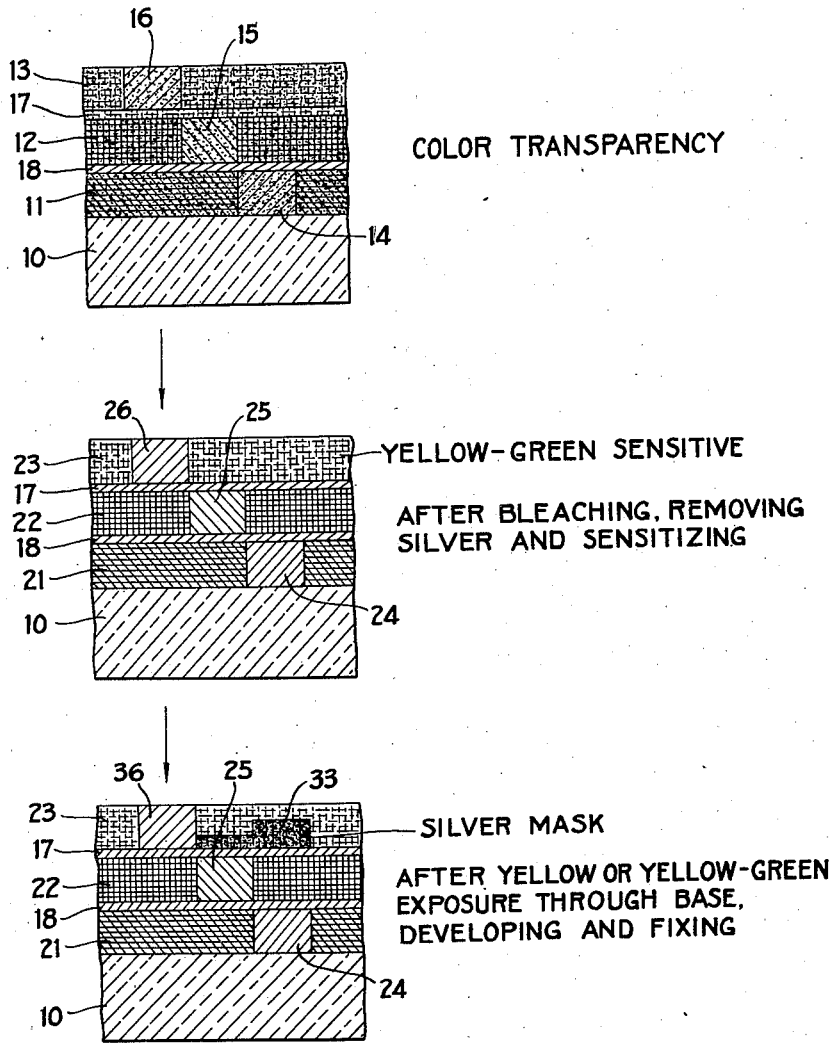

2,336,243

UNITED STATES PATENT OFFICE 2,336,243

COLOR CORRECTION MASK

Wesley T. Hanson, Jr., Rochester, N. Y., assignor to Eastman Kodak Company, Rochester, N. Y., a corporation of New Jersey Application July 8, 1941, Serial No. 401,436

6 Claims. (Cl. 95—2)

This invention relates to printing multi-layer color film and particularly to a method for obtaining color correction in printing such film.

It is well known that color prints made by uncorrected methods of photographic color reproduction suffer from degradation with more or less gray. This is due to the fact that some of the pigments or dyes used in the color print absorb light not only in the spectral regions which they are intended to absorb but also to some extent in other regions. According to the subtractive method of color photography, the color separation images are printed in colors complementary to the colors of the taking filters or the sensitivity of the emulsion layers. In three-color photography the primary colors are considered to be red, green and blue and the color separation images obtained from these are printed respectively in blue-green, magenta and yellow colors. If theoretically accurate dyes could be obtained, these dyes should absorb only their complementary colors. The blue-green should absorb the red region of the spectrum and transmit the blue and the green regions. Similarly, the magenta dye should absorb the green region of the spectrum and transmit the blue and the red regions, and the yellow dye should absorb the blue region and transmit the red and the green regions.

Dyes have not yet been found for use in color photography which absorb only in the proper spectral regions. The blue-green dye usually absorbs not only in the red region but also to some extent in the green and the blue regions. The magenta dye absorbs not only in the green region but also in the blue and red regions. The yellow dye, on the other hand, is usually quite efficient, absorbing very little except in the blue and violet region.

As a result of the light absorption of the blue-green dye in the blue and green regions of the spectrum, certain corrections must be applied in printing, or a lower concentration of magenta or yellow dye must be used in the print in order to maintain a balance of color in the scale of grays. By using less magenta or yellow dye in the print than would otherwise be used, the gray scale balance is maintained by the blue-greens. Greens and blues of the print are degraded with gray and, therefore, are less luminous than they should be, while the magentas, yellows and reds are lacking in saturation, that is, are diluted by white.

In the preparation of color separation negatives or positives by printing from a colored original, such as a multi-color transparency, this degradation of colors may be overcome by the use of masks, that is, thin positives in the case of color separation negatives, which are registered with the color separation negative in making the print. When printing from a multi-color image on photographic film onto a similar multi-layer film, it is, of course, impossible to use separate masks for the different color separation records since they must be printed simultaneously onto the printing material. If a single mask is used, the registration difficulties are considerable and in the case of small sized film, such as motion picture film, render this method of color correction impracticable.

I have discovered a method of color correction which is suitable for printing a multi-color image on multi-layer film onto a similar material and also in printing onto separate emulsion layers for making color separation records. It is of special utility in duplicating natural color transparencies or natural color motion picture film.

In the prior U. S. patent applications, Serial No. 352,902 filed August 16, 1940, in the name of R. M. Evans and Serial No. 393,580 filed May 15, 1941, in the names of Mannes et al., methods have been described for forming masking images on a multi-layer color film, by means of exposing a separate emulsion layer through the colored picture images in the lower layers. While the type of color correction introduced into the color films by these methods is similar to that obtained in the corrective method of the present invention, the present method has certain advantages, as will be apparent from the following detailed description.

I have determined that it is unnecessary to employ a separate layer, in addition to the conventional three layers carrying the three subtractive dye images, in which to form a color correction image. According to my invention, one of the color image layers, preferably the outermost layer, receives the masking image after the completion of the usual color development steps.

In the accompanying drawing are shown in sectional view the series of steps in the method of forming a color correcting mask according to my invention.

According to my invention a color transparency, prepared in a manner similar to that described in Mannes, Godowsky and Wilder U. S. Patent 2,252,718, granted August 19, 1941, and containing subtractive dye images, is treated, before the removal of the silver images, with a rehalogenating bleach solution which transforms the silver images in the film to silver halide, preferably only in the top layer. Thereafter, the remaining unbleached silver is removed and the newly formed halide sensitized to a region of the spectrum such as the yellow-green, and then the masking exposure is made through the images in the two bottom layers into the sensitive halide of the top layer by means of narrow band yellow or yellow-green light. After developing and fixing, the film is ready for printing color corrected prints.

My invention will now be described in detail with reference to the accompanying drawing.

The element shown in the first stage of the drawing contains the cyan, magenta and yellow dye images, 11, 12, and 13, and negative silver images 14, 15, and 16. The film also has positive silver images in the dye image areas 11, 12 and 13. The film has a yellow filter layer 17 between the two outermost layers and a clear gelatin layer 18 between the two lowermost layers. Layer 10 is a support of the conventional type. The dyes in the picture areas are dyes having normal absorptions in the spectral regions they are intended to absorb, and in addition, the cyan and magenta dye images may have absorptions in other regions which they are supposed to transmit. For instance, the cyan dye image may absorb red normally, but it may also absorb one-half as much blue as a yellow dye of the same density. It may also have an absorption for about one-half as much green as a magenta dye. The magenta dye image may absorb green normally, may in addition, may be absorbing as much as 25% as much blue as a yellow dye, and may absorb some red. The yellow dye image is generally considered to have a normal absorption, that is, it absorbs only blue and violet and therefore would render yellow faithfully in printing operations.

In forming a masking image in the above color transparency, I first treat the film for about 2–4 minutes, with a differential depth rehalogenizing bleach solution of the following typical composition:

| | | |
|---|---|---|
| Quinone | grams | 2 |
| Potassium bromide | do | 10 |
| Sulfuric acid | cc | 2 |
| Ethyl alcohol | cc | 10 |
| Ethylene glycol | cc | 850 |
| Water | liter | 1 |

With proper control only the silver in the upper layer is rehalogenized. The next step is to remove the silver images remaining in the lowermost layers. This is done by using an oxidizing bleach bath which does not affect the silver halide in the top layer, a suitable bath being the following:

| | | |
|---|---|---|
| Potassium bichromate | grams | 4 |
| Sulfuric acid | cc | 4 |
| Sodium sulfate | grams | 50 |
| Water to | liter | 1 |

The bleach is permitted to act for about 4–6 minutes.

The film treated in the above manner is then sensitized with a solution of the following composition, which confers sensitivity in yellow-green and red regions of the spectrum.

| | | |
|---|---|---|
| Pinacyanol | gm | 0.003 |
| Methyl alcohol | cc | 250 |
| Pyridine | cc | 1 |
| Benzotriazole | gm | 0.1 |
| Water to | liter | 1 |

In a similar manner sensitivity in the green region may also be conferred.

The film now appears as shown in the second stage of the drawing, and contains the cyan, magenta and yellow dye images, 21, 22 and 23. The upper layer is light sensitive throughout, areas 24, 25 and 26 are colorless. Layers 18 and 17 are both colorless since the dye in layer 17 has been removed by the bichromate solution.

In order to form the color correction mask in the outer layer, the film is now exposed from the support side with yellow or yellow-green light through the cyan and magenta image layers. After ordinary silver halide developing and fixing, the film appears as shown in the third stage of the drawing, and contains the silver masking image 33 in the upper layer. Area 36 of the outer layer is clear, no masking image having been recorded therein. The maximum density in the image 33 corresponds to the region in the images 21 and 22 transmitting the most light of the exposing wavelength. Thus the region in the magenta image 22 having no cyan image over it, passes the greatest amount of light when yellow light is used. When a yellow-green exposing light of wavelength of about 5900 Å is used, the greatest density in the mask appears over the region having no magenta image in register with the cyan image. The use of narrow band light in exposing masks of this photographic character, has been described in the Evans U. S. patent application above cited. The principal difference between the method of the present invention and the prior art method cited, lies in the fact that the latter utilizes an additional layer for receiving the masking image.

If, in the present invention, the outer layer 23 of the second stage of the drawing, has been red sensitized, instead of yellow-green, a red or other light exposure of longer wavelength than blue may be made through the colored images in the bottom layers of the film and an image of the light transmission of the layer is recorded in the sensitive outer layer. After developing and fixing the corrected film may be used for printing onto another multilayer film or for the preparation of color separation images.

If it is desired, the exposures producing the masking images according to the manner of my invention, may be so regulated to compensate for the false absorptions of the dyes in the final multilayer printing material, as well as the impure absorptions of the dyes in the original.

The usefulness of my invention may be amplified when it is understood how I may further treat a color film carrying a masking image of the invention. Once the required color corrected copies have been made from the film, the silver image may be removed in a known manner and used for projection purposes, or, if the negative image has not been made so dense as to affect the picture quality upon viewing or projecting, in order to make copies, I may bring the density to the required value by physical development.

Alternately, when the mask has once served its purpose I may convert the silver to relatively invisible halide, such as silver iodide, and subsequently, when it is desired to produce more copies, the image may be reduced by the proper reagents; or, a mixture of dyes may be mordanted to it so as to produce a neutral image. In case the method of conversion of the image to iodide is used, this may be repeated as often as desired or as long as the proper quality of masking image is obtained.

The invention has been described in the manner of operation which may be used when the silver images in an original transparency are bleached to halide only in the top layer. If it is desired, one may bleach all of the silver images in all layers to silver halide, and after sensitization of the outer layer in the desired region, an exposure may be made into the layer through the lower layers, and by means of a slowly penetrating developer, the masking image is developed in the top layer only; whereas, if an ordinary developer were used it is possible that a certain amount of fog might be recorded in the lower layers due to a slight sensitivity of the halide in these layers to light of the wave-length passing through these layers.

It will be observed that by application of the method of my invention together with the use of the proper sensitizing agents and exposing lights, practically any desired correction may be introduced into a color film. Therefore, it is to be understood that the disclosure herein is by way of example and that I consider as included in my invention all modifications and equivalents falling within the scope of the appended claims.

What I claim is:

1. The method of preparing a color correcting image in a multi-color printing element comprising a plurality of superposed layers containing silver and dye images, which comprises bleaching the silver images to a silver salt, sensitizing the outermost layer to visible light of longer wavelength than blue, exposing said layer through the dye images in the other layers with light of a color to which the outermost layer is sensitized, developing a silver image in said layer and removing the silver halide from the element.

2. The method of preparing a color correcting image in a multi-color printing element comprising a plurality of superposed layers containing silver and dye images, which comprises bleaching the silver images to a silver salt in the outer layer, sensitizing said layer to visible light of longer wavelength than blue, removing the silver images in the other layers, exposing said layer through the dye images in the other layers with light of a color to which the outermost layer is sensitized, developing a silver image in said layer and removing the silver halide from the element.

3. The method of preparing a color correcting image in a multi-color printing element containing silver and dye images, which comprises bleaching the silver images to a silver salt in the outer layer, removing the silver images in the other layers, sensitizing the outermost layer to yellow-green light, exposing said layer through the dye images in the other layers with light of a color to which the outermost layer is sensitized, developing a silver image in said layer and removing the silver halide from the element.

4. The method of preparing a color correcting image in a multi-color printing element comprising a plurality of superposed layers containing silver and dye images, which comprises bleaching the silver images to a silver salt in the outer layer, removing the silver images in the other layers, sensitizing the outermost layer to yellow-green light, exposing said layer with light of a wavelength of about 5900 A., through the dye images in the other layers, developing a silver image in said layer and removing the silver halide from the element.

5. The method of preparing a color correcting image in a multi-color printing element comprising a plurality of superposed layers containing silver and dye images, which comprises bleaching the silver images to a silver salt in the outer layer, removing the silver images in the other layers, sensitizing the outermost layer to red light, exposing said layer through the dye images in the other layers with light of a color to which the outermost layer is sensitized, developing a silver image in said layer and removing the silver halide from the element.

6. The method of preparing a color correcting image in a multi-color printing element comprising a plurality of superposed layers containing silver and dye images, which comprises bleaching the silver images to a silver salt in the outer layer, removing the silver images in the other layers, sensitizing the outermost layer to red light, exposing said layer with red light through the dye images in the other layers, developing a silver image in said layer and removing the silver halide from the element.

WESLEY T. HANSON, Jr.